(12) United States Patent
Griffin (10) Patent No.: US 9,434,464 B1
(45) Date of Patent: Sep. 6, 2016

(54) WINDOW EXHIBITING REDUCED SOUND TRANSMISSION AND METHOD OF MAKING THE SAME

(75) Inventor: Steven F. Griffin, Albuquerque, NM (US)

(73) Assignee: THE BOEING COMPANY, Chicago, IL (US)

( * ) Notice: Subject to any disclaimer, the term of this patent is extended or adjusted under 35 U.S.C. 154(b) by 563 days.

(21) Appl. No.: 12/836,759

(22) Filed: Jul. 15, 2010

(51) Int. Cl.
*B64C 1/14* (2006.01)
*B64C 1/40* (2006.01)

(52) U.S. Cl.
CPC .............. *B64C 1/1484* (2013.01); *B64C 1/40* (2013.01); *Y10T 428/249929* (2015.04)

(58) Field of Classification Search
CPC ....... B29C 70/00; B29C 70/04; B29C 70/06; B29C 70/081; B29C 70/083; B29C 43/203; E04C 2/54; E04C 1/42; E04C 2/22; B32B 5/22; B32B 2605/18; B28B 19/0046; B64C 1/12; B64C 1/14; B64C 1/1476; B64C 1/1484; B64C 1/1492; B64C 1/40; E01F 8/0017; C08J 5/24; B29K 2105/06; Y10T 428/162; Y10T 428/249929; Y10T 428/24994; Y10T 248/249942
USPC .............. 52/204.5, 306–308, 630, 309.1, 52/309.13–309.16, 315, 171.1, 204.593, 52/286.11, 745.19; 244/129.3, 119; 428/46, 34, 292.1, 297.1, 918
See application file for complete search history.

(56) References Cited

U.S. PATENT DOCUMENTS

| | | | |
|---|---|---|---|
| 2,311,613 A * | 2/1943 | Games .......................... 442/180 |
| 2,688,580 A * | 9/1954 | Fingerhut ...................... 264/77 |
| 3,291,868 A * | 12/1966 | Brown .................. B29C 70/585 | 264/1.34 |
| 4,004,388 A * | 1/1977 | Stefanik .................... 52/204.593 |
| 4,819,395 A * | 4/1989 | Sugita et al. ............... 52/309.16 |
| 5,039,566 A | 8/1991 | Skubic et al. |
| 5,040,352 A * | 8/1991 | Oberlander et al. ........ 52/786.11 |
| 5,091,250 A | 2/1992 | Chum et al. |
| 5,372,866 A * | 12/1994 | Oberlander et al. ........... 428/110 |
| 5,665,450 A * | 9/1997 | Day et al. ...................... 428/114 |
| 5,794,403 A * | 8/1998 | Oberlander et al. ........ 52/786.11 |
| 6,838,148 B1 * | 1/2005 | Ehnert et al. .................. 428/109 |
| 7,028,950 B2 * | 4/2006 | Salmon ................. B29C 70/763 | 244/129.3 |
| 7,438,263 B2 | 10/2008 | Rassaian et al. |
| 7,651,756 B2 | 1/2010 | Albers et al. |
| 7,778,500 B2 * | 8/2010 | Ng et al. ......................... 385/13 |
| 2003/0008126 A1 * | 1/2003 | Boesman ................ B29C 70/22 | 428/300.7 |
| 2005/0051255 A1 * | 3/2005 | Nordman ...................... 156/108 |
| 2005/0082432 A1 * | 4/2005 | Nordman ................... 244/129.3 |
| 2008/0241537 A1 * | 10/2008 | Sennett ................... B29C 70/10 | 428/394 |
| 2011/0281484 A1 * | 11/2011 | Yoshida ................. C03C 13/00 | 442/180 |
| 2013/0175116 A1 * | 7/2013 | Kedar .................... E01F 8/0017 | 181/294 |

OTHER PUBLICATIONS

Sun, J.Q., et al; "Passive, Adaptive and Active Tuned Vibration Absorbers—A Survey;" Transactions of the ASME, Special 50th Anniversary Design Issue; vol. 117, Jun. 1995 pp. 234-242.

(Continued)

*Primary Examiner* — Joshua J Michener
*Assistant Examiner* — Theodore Adamos
(74) *Attorney, Agent, or Firm* — Parsons Behle & Latimer (57) ABSTRACT

A window includes a substantially transparent polymer window member and means for selectively stiffening the window member over its area to reduce sound transmitted through the window.

18 Claims, 6 Drawing Sheets

(56) References Cited

OTHER PUBLICATIONS

Jolly, M.R. and Sun, J.Q.; "Passive Tuned Vibration Absorbers for Sound Radiation Reduction From Vibrating Panels;" Journal of Sound and Vibration; vol. 191 (4), 1996, pp. 577-583.

Howard, Dr. Carl Q., and Prof. Colin H. Hansen; "Investigation of Passive Control Devices for Potential Application to a Launch Vehicle Structure to Reduce the Interior Noise Levels During Launch;" Final Report for Stage 4, Task 4.5; University of Adelaide; May 25, 2006.

Carneal, J.P., et al; "Minimzation of Sound Radiation From Plates Using Adaptive Tuned Vibration Asorbers;" Journal of Sound and Vibration, vol. 270, 2004; pp. 781-792.

* cited by examiner

WINDOW EXHIBITING REDUCED SOUND TRANSMISSION AND METHOD OF MAKING THE SAME

TECHNICAL FIELD

This disclosure generally relates to windows, especially those used in aircraft, deals more particularly with a composite polymer window exhibiting reduced sound transmission.

BACKGROUND

In many applications such as in aircraft, passenger viewing windows may be made from optically transparent polymers such as acrylic, rather than glass which is relatively heavy, brittle and may be difficult to form into complex shapes. Polymer windows are also desirable for aircraft applications because they are somewhat flexible and resilient, allowing them to withstand impact loads such as bird strikes. However, because of their relative flexibility, polymer windows may be more efficient than glass windows in transmitting sounds outside the aircraft into interior cabin spaces. Symmetrically shaped polymer windows may be especially efficient at amplifying and transmitting sound in the 100-500 Hz frequency range. One solution to the problem consists of increasing the thickness of the polymer window, however this solution may be undesirable in some applications because the increase in window thickness adds weight to the aircraft.

Accordingly, there is a need for a polymer window that is effective in reducing sound transmission without substantially increasing its weight, while maintaining the quality of its optical transparency. There is also a need for a method of fabricating such a window that is efficient, economical, and well suited to higher production environments.

SUMMARY

Sound transmission through polymer windows is reduced by selectively stiffening portions of the window with substantially transparent glass fibers. The inclusion of glass fibers in selected regions of the window reduces the radiation and transmission efficiency of the window, resulting in attenuation of sound transmission, without materially increasing the weight of the window or degrading its optical transparency. Optimum regional placement of the glass fibers to achieve asymmetric stiffening of the window may be accomplished using an algorithm.

According to one disclosed embodiment, a window is provided having reduced sound transmission. The window comprises a substantially transparent polymer window member, and means for selectively stiffening the window member over its area to reduce sound transmitted through the window member. The stiffening means may include substantially transparent gas fibers that are either embedded into the window member or into layers of material that are laminated with the window member. The glass fibers stiffen different regions of the window.

According to another disclosed embodiment, a window is provided exhibiting reduced sound transmission. The window comprises a substantially transparent polymer window member, and a substantially transparent reinforcement for stiffening selected regions of the window member. The selected regions are asymmetrically distributed over the viewing area of the window member. The reinforcement includes substantially transparent glass fibers which may be embedded into the window member or into one or more layer of substantially transparent material covering the window member.

According to a further embodiment, a method is provided of making a window exhibiting reduced sound transmission. The method comprises forming a substantially transparent polymer window member, and selectively stiffening regions of the window member. The selective stiffening may be performed by stiffening regions of the window member in an asymmetric pattern, using substantially transparent glass fibers. Alternatively, the selective stiffening may include placing substantially transparent glass fibers in a layer of substantially transparent material, and covering the window member with the layer of material. The method may further comprise determining the regions of the window member that should be stiffened in order to optimize the reduction of sound transmitted through the window.

BRIEF DESCRIPTION OF THE ILLUSTRATIONS

DETAILED DESCRIPTION

Figure 1:
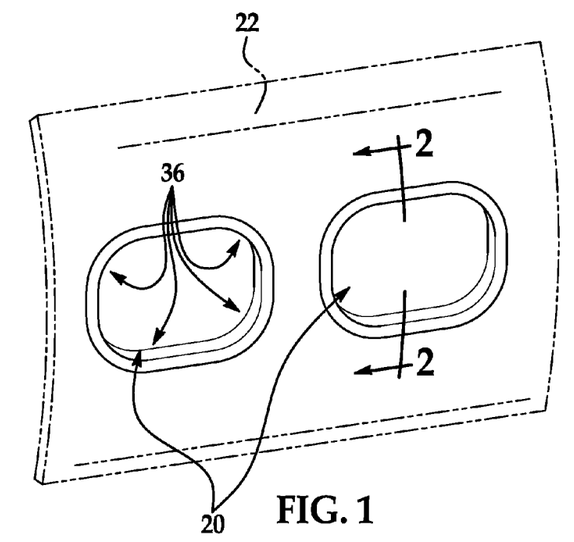
FIG. 1 is an illustration of a perspective view of a portion of an aircraft fuselage having polymer viewing windows that exhibit reduced sound transmission.
Figure 2:
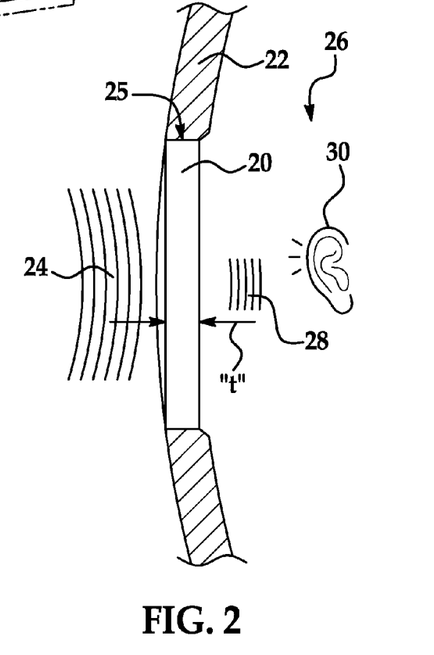
FIG. 2 is an illustration of a sectional view taken along the line 2-2 in FIG. 1.

Referring to FIGS. 1 and 2, the disclosed embodiments relate to a substantially transparent composite window 20 that exhibits reduced transmission and radiation of sound 24. In the illustrated embodiment, the window 20 is shown mounted in the fuselage 22 of an aircraft (not shown) to allow passengers to view through the fuselage 22 from an interior cabin space 26. FIG. 2 illustrates the window 20 as being a single component, however in practical applications, the window 20 may comprise an assembly of multiple components, including an inner and outer window (not shown) as well as mounting hardware (not shown) and seals (not shown) used to mount the window 20 within an opening 25 in the fuselage 22.

Sound 24 outside the fuselage 22 may be transmitted through the window 20 and radiated at 28 into the interior cabin space 26 where it may be heard at 30 by passengers. The window is oriented so that the direction of its thickness "t" is primarily normal to the direction of travel of sound 24 impinging upon the window 20 from sources (not shown) outside the fuselage 22, causing the window 30 to vibrate. Normally, the window 20 transmits and amplifies low frequency sounds at its lower resonant frequencies. In accordance with the disclosed embodiments, the window 20 is selectively stiffened over its viewing area 36 by regional reinforcements (not shown in FIGS. 1 and 2) later described. This selective stiffening results in passive tuned vibration absorbsion and sound radiation reduction from the vibrating window 20.

Figure 3:
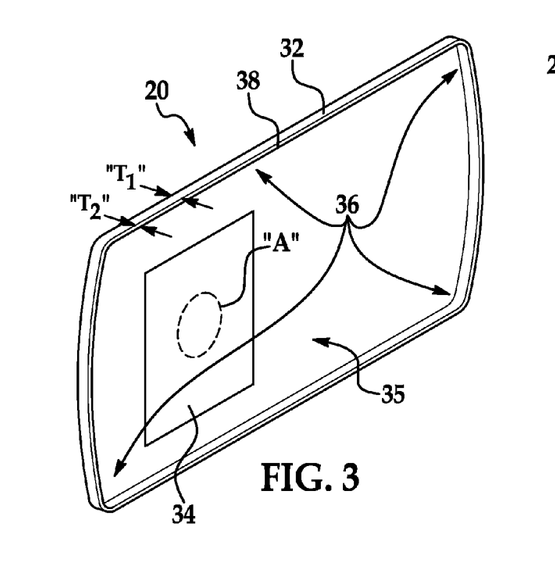
FIG. 3 is an illustration of a perspective view of the window shown in FIGS. 1 and 2, and depicting one region of reinforcement.
Figure 4:
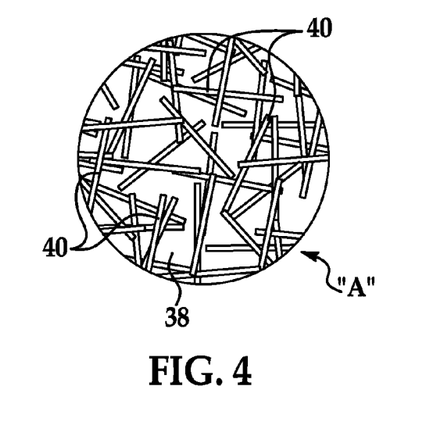
FIG. 4 is an illustration of the area designated as "A" in FIG. 3, better showing the reinforcing glass fibers.
Figure 5:
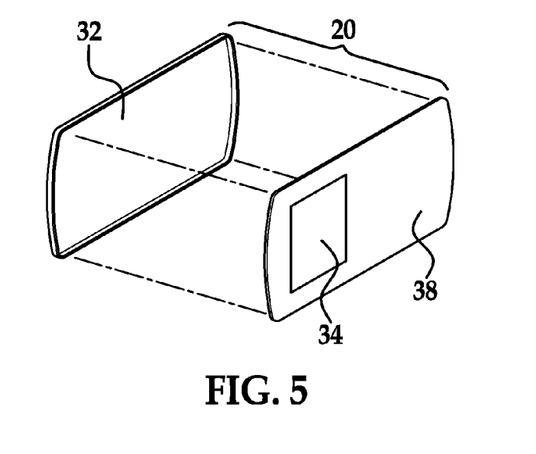
FIG. 5 is an illustration of an exploded, perspective view of the window shown in FIG. 3.

Attention is now directed to FIGS. 3-5 which illustrate one embodiment of a window 20 exhibiting reduced sound transmission. In this example, the window 20 is a composite laminate comprising a substantially transparent window member 32 and a composite laminate ply or layer 38 laminated to and covering substantially the entire viewing area 36 of the window member 32. The window 20 is generally rectangular in shape in the illustrated embodiment, however a variety of other shapes are possible. The opposite faces 35 of the window 20 may be curved as shown in FIG. 3, or they may be flat, depending upon the application. Both the window member 32 and the layer 38 may comprise a polymer such as, for example and without limitation, acrylic, that is substantially transparent. As used herein, "substantially transparent" means materials that are optically transparent as well as those that are somewhat transparent, and those that are translucent. Thus, in some applications, the window 20 may have some amount of color, rendering it semi-transparent or translucent rather than completely transparent. The thicknesses of the window member 32 and layer 38, $T_1$, $T_2$ respectively, will vary with the application, however in one practical example, a layer 38 between approximately 0.01 and 0.1 inches thick was suitable for use with a window member 32 having at thickness of approximately 0.4 inches. In the example shown in FIGS. 3-5, only a single layer 38 is laminated to a face 35 of the window member 32, however as will be discussed below, more than one layer 38 may be desired or necessary in some applications.

The composite layer 38 comprises a matrix material that is compatible with the window member 32 and includes one or more reinforcing regions 34 that function to selectively stiffen the window member 32 over its viewing area 36. The selective stiffening of the window member 32 may reduce the acoustic coupling of the window 20 to the interior cabin space 26 which is defined by the modal sum of the out-of-plane deflection of the window motion and the local acoustic pressure. This acoustic coupling is directly related to the efficiency or effectiveness of the window 20 in transmitting sound 24 from outside the fuselage 20 to the interior cabin space 26. In accordance with the disclosed embodiments, the window member 32 is selectively stiffened over its viewing area 36 by introducing substantially transparent, relatively high strength glass fibers 40 into the matrix material forming the composite layer 38, in one or more regions 34 where reinforcement is required to achieve the desired stiffness. The glass fibers 40 may be randomly oriented, as shown in FIG. 4, generally within planes (not shown) that are parallel to each other so that they resist out-of-plane deflection of the window member 32 in the region 34 of reinforcement. Additional details of a glass reinforced composite suitable for use as the composite layer 38 and method of making the composite is disclosed in U.S. Pat. No. 5,665,450 issued Sep. 9, 1997, the entire disclosure of which is incorporated by reference herein.

In the example shown in FIGS. 3-5, the reinforcement region 34 is off-center within the viewing area 36, consequently the achieved stiffening of the window member is asymmetric. For sake of simplicity, only a single reinforcement region 34 is shown in FIGS. 3-5 covering the entire viewing area 36 of the window member 32, however as will become apparent below, the window member 32 may be stiffened in a plurality of regions 34 which collectively form an asymmetric pattern that is optimized using a later discussed algorithm. Also, in some embodiments, the layer 38 may not cover the entire viewing area 36, but rather may cover only a portion of the viewing area 36. In those cases where the window 20 may have some amount of color, e.g. color tinting, the glass fibers 40 may have the same color as the window 20 so that the fibers 40 will not be readily visible.

Figure 6:
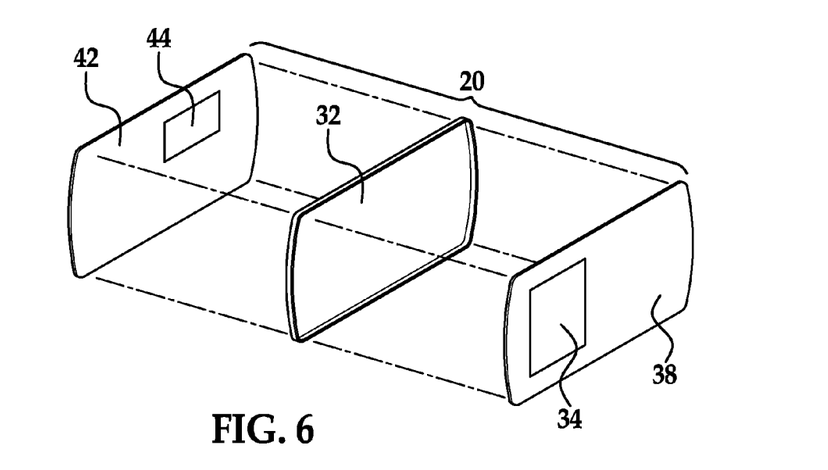
FIG. 6 is an illustration of an exploded, perspective view of an alternate embodiment of the window showing two layers containing regions of glass fiber reinforcements.
Figure 7:
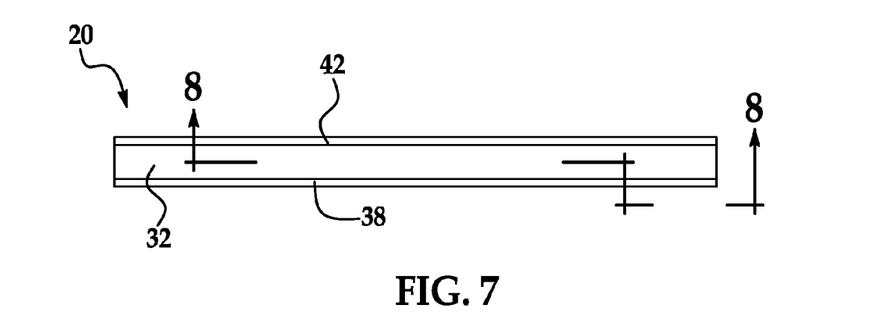
FIG. 7 is an illustration of a plan view of the window shown in FIG. 6.
Figure 8:
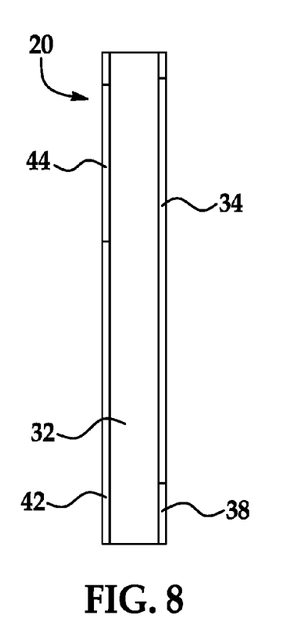
FIG. 8 is an illustration of a sectional view taken along the line 8-8 in FIG. 7.

FIGS. 6-8 illustrate another embodiment of the window 20 comprising a window member 32 sandwiched between two laminated layers 38, 42 respectively having reinforcing regions 34, 44 located in differing areas of the viewing area 36 after the window 20 is assembled.

Figure 9:
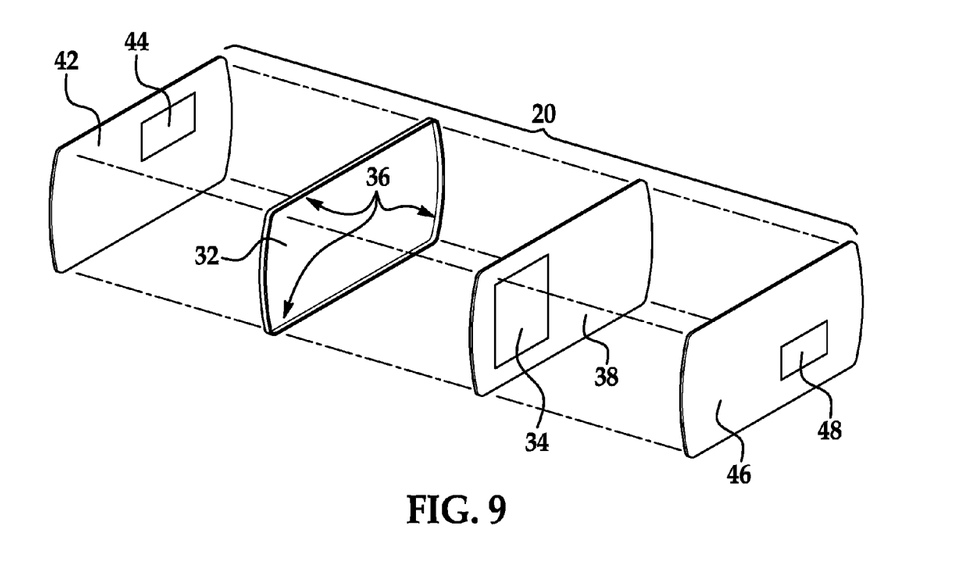
FIG. 9 is an illustration of an exploded, perspective view of another embodiment of a window having three layers containing regions of glass fiber reinforcements.

FIG. 9 illustrates a further embodiment of the window 20 comprising three layers 38, 42, 46 that cover and are laminated to the window member 32. In this example, the laminate layers 38, 42, 46 have respective reinforcing regions 34, 44, 48 that cover corresponding regions of the window member 32 and are all asymmetrically arranged over the viewing area 36. Although not shown in the Figures, more than 3 layers 38, 42, 46 may be employed to selectively stiffen areas of the window member 32 by building up reinforcing regions 34, 44, 48 on a layer-by-layer basis to achieve the desired stiffening pattern over the viewing area 36.

In the examples previously discussed in connection with FIGS. 3-9, the stiffening provided by the reinforcing regions 54 (FIG. 12) was effected through a form of post-processing in which the layers containing the reinforcement are laminated to the window member 32 after the window member 32 has been manufactured. However, the selective stiffening may instead be achieved by an in situ process, and in this connection attention is now directed to FIGS. 10 and 11 which illustrate another embodiment of the window 20. In this example, an asymmetric pattern of reinforcing regions 34, 44, 48 is achieved by layering glass fibers 40 within the window member 32 in situ, as the window member 32 is being manufactured. In the illustrated example, the reinforcement regions 34, 44, 48 are embedded at different levels within the window member 32, and each of the reinforcement sections 34, 44, 48 may have differing depths, $D_1$, $D_2$, $D_3$ respectively. However in other embodiments, two or more of the reinforcing regions 34, 44, may be embedded at the same level within the window member 32 and/or may have the same depths.

Figure 12:
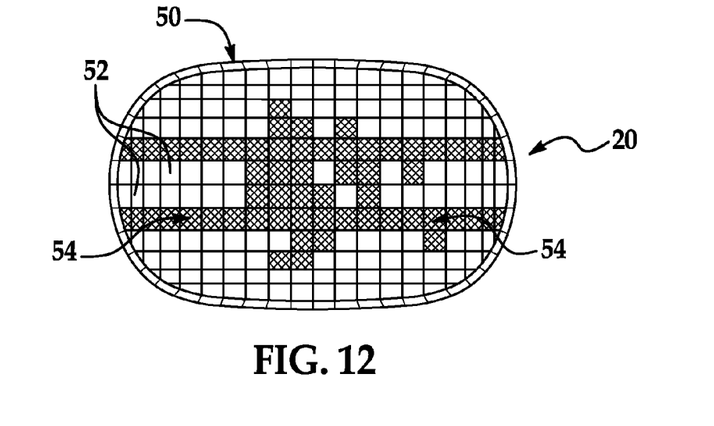
FIG. 12 is an illustration useful for explaining a technique for determining the regions of the window to be reinforced in order to achieve optimized asymmetric stiffening of the window.

FIG. 12 illustrates a pattern 50 that may be mathematically developed using a suitable algorithm (not shown) for determining the regions 54 that should be reinforced in order to asymmetrically stiffen the window 20 to minimize acoustic coupling of sound 24 through the window 20. In this model, the window 20 is divided into rectangular segments 52 which the algorithm uses to determine the regions 54 that should be selectively stiffened in order to minimize the acoustic coupling.

Figure 13:
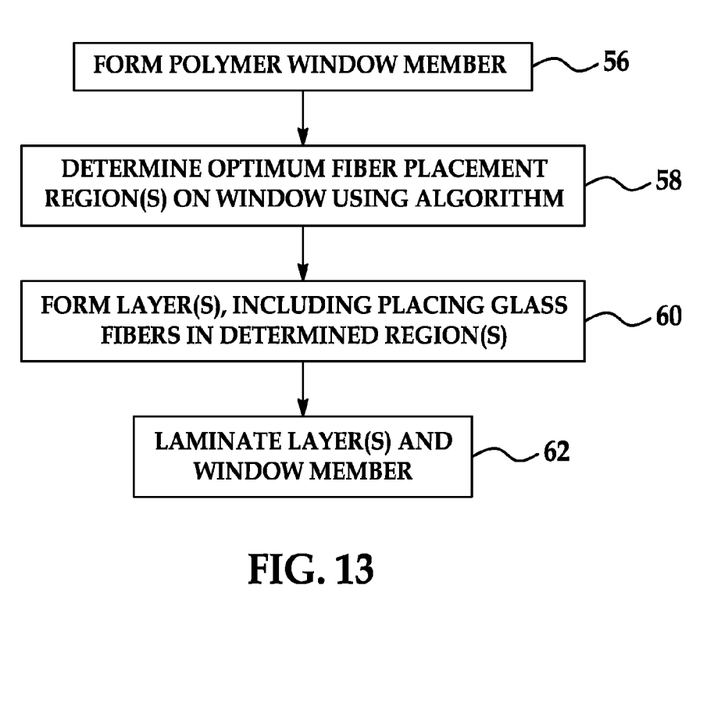
FIG. 13 is an illustration of a flow diagram of one method of selectively stiffening the polymer window.

Referring now to FIG. 13, a method of making a polymer window exhibiting reduced sound transmission is shown, which begins at step 56 in which a polymer window member is produced from a suitable polymer material, such as acrylic, according to a desired shape, thickness and curvature. At step 58, the regions 54 (FIG. 12) of the window 20 that are to be reinforced in order to minimize acoustic coupling are determined, using a suitable algorithm, or other techniques. Next, at step 60, one or more layers, e.g. 38, 42, 46 (FIG. 9) of a polymer material are formed, including placing substantially transparent glass fibers in or on the layers in the regions 54 that were determined in step 58. Finally, at step 62, the reinforcement layers (38, 42, 46) and the window member 32 are laminated together.

Figure 10:
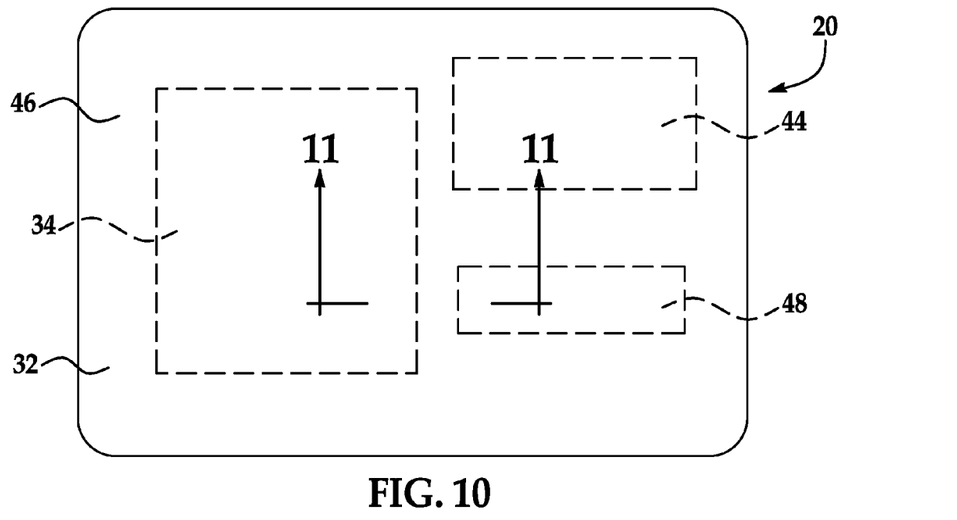
FIG. 10 is an illustration of a front view of another embodiment of the window in which glass fiber reinforcements are integrated into regions of the window member.
Figure 11:
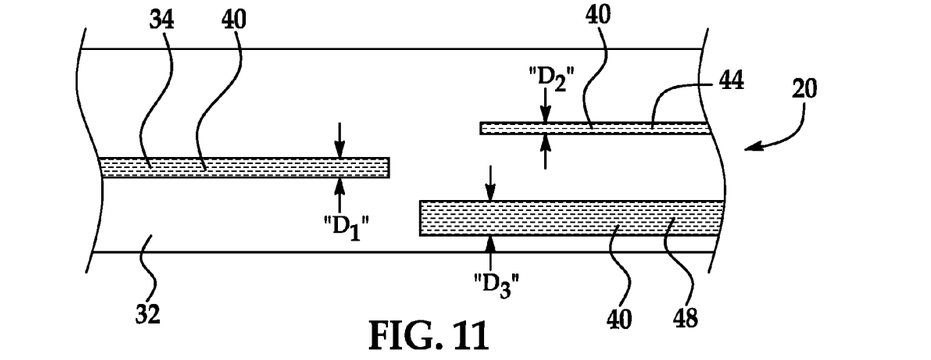
FIG. 11 is an illustration of a sectional view taken along the line 11-11 in FIG. 10.
Figure 14:
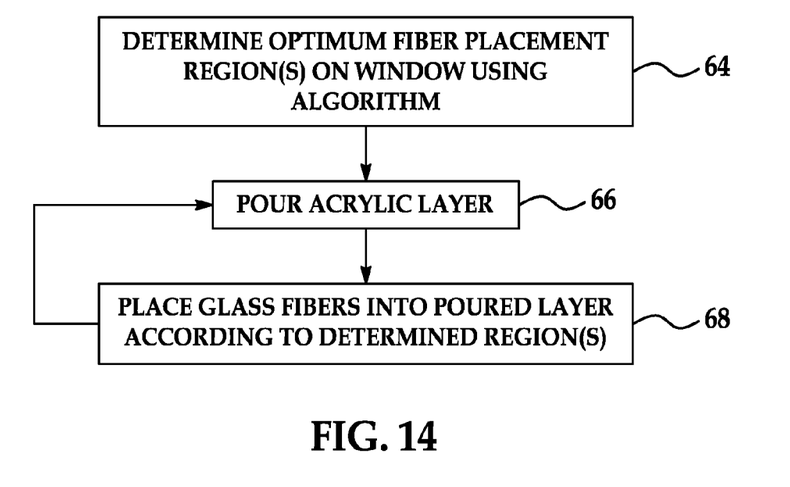
FIG. 14 is an illustration of a flow diagram of another method of selectively stiffening the polymer window.

FIG. 14 illustrates an alternate method of making the embodiment of the window 20 shown in FIGS. 10 and 11 in which the substantially transparent glass reinforcing fibers 40 are embedded within the window member 32. Beginning at step 64, the optimum regions 54 for fiber placement on the window 20 are determined using a suitable algorithm, or other means. Next, at step 66, multiple layers of a suitable acrylic are formed while, at step 68, substantially transparent glass fibers are placed on or in one or more of the layers within the regions 54 determined in step 64. The process of forming additional layers at 66 and introducing glass fibers 40 into the appropriate regions at step 68 is repeated until the entire desired thickness of the window 20 is achieved.

Figure 15:
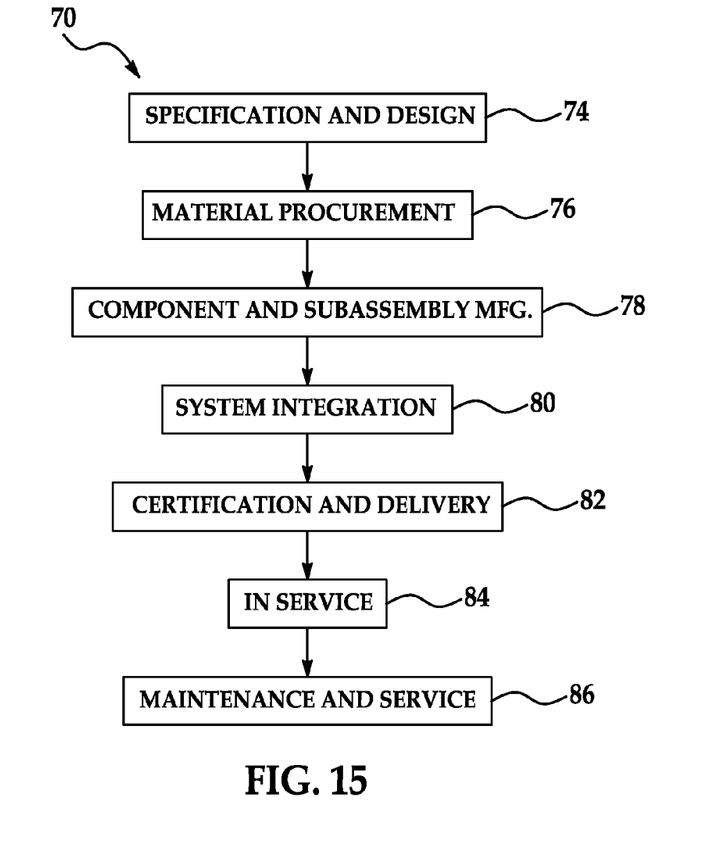
FIG. 15 is a flow diagram of aircraft production and service methodology.
Figure 16:
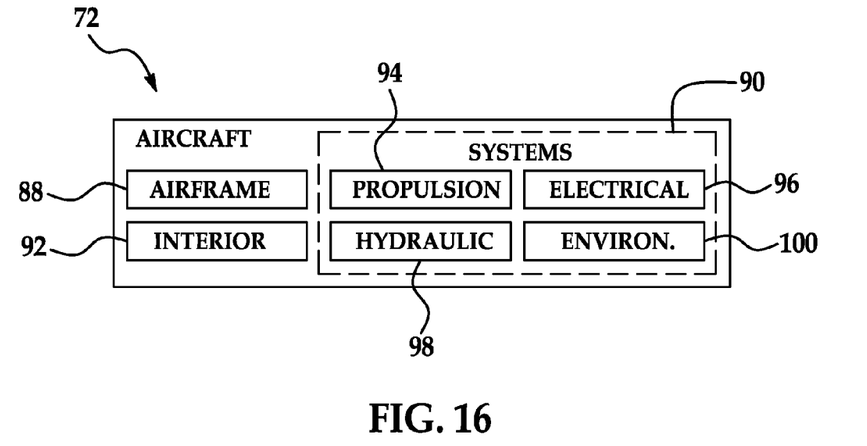
FIG. 16 is a block diagram of an aircraft.

Referring next to FIGS. 15 and 16, embodiments of the disclosure may be used in the context of an aircraft manufacturing and service method 70 a shown in FIG. 15 and an aircraft 72 as shown in FIG. 16. During pre-production, exemplary method 76 may include specification and design 74 of the aircraft 72 and material procurement 76. During production, component and subassembly manufacturing 78 and system integration 80 of the aircraft 72 takes place, in which the disclosed window 20 may be installed on the aircraft 72. Thereafter, the aircraft 72 may go through certification and delivery 82 in order to be placed in service 84. While in service by a customer, the aircraft 72 may be scheduled for routine maintenance and service 86 (which may also include modification, reconfiguration, refurbishment, and so on).

Each of the processes of method 72 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 72 produced by exemplary method 70 may include an airframe 88 with a plurality of systems 90 and an interior 92. The disclosed windows 20 may be installed in a fuselage forming part of the airframe 88. Examples of high-level systems 90 include one or more of a propulsion system 94, an electrical system 96, a hydraulic system 98, and an environmental system 100. Any number of other systems may be included. Although an aerospace example is shown, the principles of the invention may be applied to other industries, such as the marine and automotive industries.

The window embodied herein may be employed during any one or more of the stages of the production and service method 70. For example, components or subassemblies corresponding to production process 78 may be fabricated or manufactured in a manner similar to components or subassemblies produced while the aircraft 72 is in service. Also, one or more of the windows 20 may be utilized during the production stages 78 and 80, for example, by substantially expediting assembly of or reducing the cost of an aircraft 72. Similarly, one or more embodiments may be utilized while the aircraft 72 is in service, for example and without limitation, during maintenance and service 86.

Although the embodiments of this disclosure have been described with respect to certain exemplary embodiments, it is to be understood that the specific embodiments are for purposes of illustration and not limitation, as other variations will occur to those of skill in the art.

What is claimed:

1. A window having reduced sound transmission, comprising:
a substantially transparent polymer window member, having a perimeter, a thickness, opposing parallel window surfaces, and a viewing area within the perimeter; and
a plurality of discrete, generally planar, transparent reinforcement regions, connected to the window member, that are (i) parallel to the window surfaces, and (ii) asymmetrically located away from the perimeter within the viewing area, the reinforcement regions selectively asymmetrically stiffening the window member to transmitted therethrough, wherein each of the transparent reinforcement regions extends through less than the thickness of the window member, wherein the transparent reinforcement regions are non-overlapping along a plane corresponding to the viewing area, and wherein the transparent reinforcement regions are non-overlapping along a cross-section plane corresponding to the thickness of the window member.

2. The window of claim 1, wherein the transparent reinforcement regions comprise substantially transparent glass fibers.

3. The window of claim 2, wherein the glass fibers in each reinforcement region are randomly oriented.

4. The window of claim 1, wherein at least one of the transparent reinforcement regions are embedded in the window member.

5. The window of claim 4, wherein the at least one of the embedded transparent reinforcement regions comprises reinforcement at multiple discrete reinforcement regions embedded at multiple positions relative to the thickness of the window member.

6. The window of claim 1, wherein the transparent reinforcement regions comprise a first layer of material covering at least a portion of a first one of the window surfaces.

7. The window of claim 6, wherein the transparent reinforcement regions include a second layer of material covering at least a portion of a second one of the window surfaces.

8. A window for an aircraft fuselage, comprising:
a substantially transparent polymer window member, configured to mount in an aircraft fuselage, having a perimeter, a thickness, opposing parallel window surfaces, and a viewing area within the perimeter; and
a plurality of discrete, generally planar, transparent reinforcement regions, connected to the window member, that are (i) parallel to the window surfaces, and (ii) asymmetrically located away from the perimeter within the viewing area, the reinforcement regions selectively asymmetrically stiffening the window transmitted therethrough, wherein each of the transparent reinforcement regions extends through less than the thickness of the window member, wherein the transparent reinforcement regions are non-overlapping along a plane corresponding to the viewing area, and wherein the transparent reinforcement regions are non-overlapping along a cross-section plane corresponding to the thickness of the window member.

9. The window of claim 8, wherein the transparent reinforcement regions comprise substantially transparent glass fibers.

10. The window of claim 9, wherein the glass fibers are randomly oriented within the respective reinforcement region.

11. The window of claim 8, wherein at least one of the transparent reinforcement regions are embedded in the window member.

12. The window of claim 11, wherein the at least one of the embedded transparent reinforcement regions comprises reinforcement at multiple discrete reinforcement regions embedded at multiple positions relative to the thickness of the window member.

13. The window of claim 8, wherein at least one of the reinforcement regions comprises a first polymer lamination, overlying and bonded to a first one of the opposing window surfaces.

14. The window of claim 13, wherein the at least one of the reinforcement regions includes a second polymer lamination, overlying and bonded to a second one of the opposing window surfaces.

15. A method of making a window exhibiting reduced sound transmission, comprising:
   forming a substantially transparent polymer window member having a perimeter, a thickness, opposing parallel window surfaces, and a viewing area within the perimeter; and
   connecting the window member to a plurality of discrete, generally planar, transparent reinforcement regions that are (i) parallel to the window surfaces, and (ii) asymmetrically located away from the perimeter within the viewing area, the reinforcement regions window member, wherein each of the transparent reinforcement regions extends through less than the thickness of the window member, wherein the transparent reinforcement regions are non-overlapping along a plane corresponding to the viewing area, and wherein the transparent reinforcement regions are non-overlapping along a cross-section plane corresponding to the thickness of the window member.

16. The method of claim 15, wherein selectively stiffening regions of the window member includes embedding substantially transparent glass fibers into the window member.

17. The method of claim 15, wherein selectively stiffening regions of the window member includes:
   placing substantially transparent glass fibers in a layer of a substantially transparent material; and
   laminating at least a portion of one of the window surfaces with the layer of material.

18. The method of claim 15, further comprising determining portions of the window member that should be stiffened to optimize the reduction of sound transmitted through the window member, wherein the reinforcement regions collectively form an asymmetric stiffening pattern.

* * * * *